United States Patent
Bruggeman et al.

[15] 3,690,301
[45] Sept. 12, 1972

[54] CAGES FOR REARING ANIMALS

[72] Inventors: Frans Bruggeman, Kortrijk; Fernand Schmidt, De Pinte, both of Belgium

[73] Assignee: N.V. Bekaert S.A., Zwenegem, Belgium

[22] Filed: May 28, 1970

[21] Appl. No.: 41,519

[30] Foreign Application Priority Data

June 2, 1969 France......................6917984

[52] U.S. Cl...................................119/18, 119/63
[51] Int. Cl. ..............................................A01k 05/00
[58] Field of Search.................119/17, 18, 21, 33, 63

[56] References Cited

UNITED STATES PATENTS

| | | |
|---|---|---|
| 2,041,049 | 5/1936 | Crawford................119/18 X |
| 928,560 | 7/1909 | Stewart......................119/63 |
| 1,785,858 | 12/1930 | Davis.........................119/17 |
| 2,292,981 | 8/1942 | Willett et al................119/33 |

*Primary Examiner*—Hugh R. Chamblee
*Attorney*—Sparrow & Sparrow

[57] ABSTRACT

Cages or batteries for the rearing of a plurality of animals. The cage comprises a feed trough extending along one side of the cage in which a movable panel is disposed which constitutes an access door to the cage. The movable panel carries separating members which are removable engageable with the feed trough. The arrangement is such that with the separating members engaged with the feed trough, animals within the cage are enabled to feed from the feed trough with said members separating at least the heads of adjacent animals.

5 Claims, 12 Drawing Figures

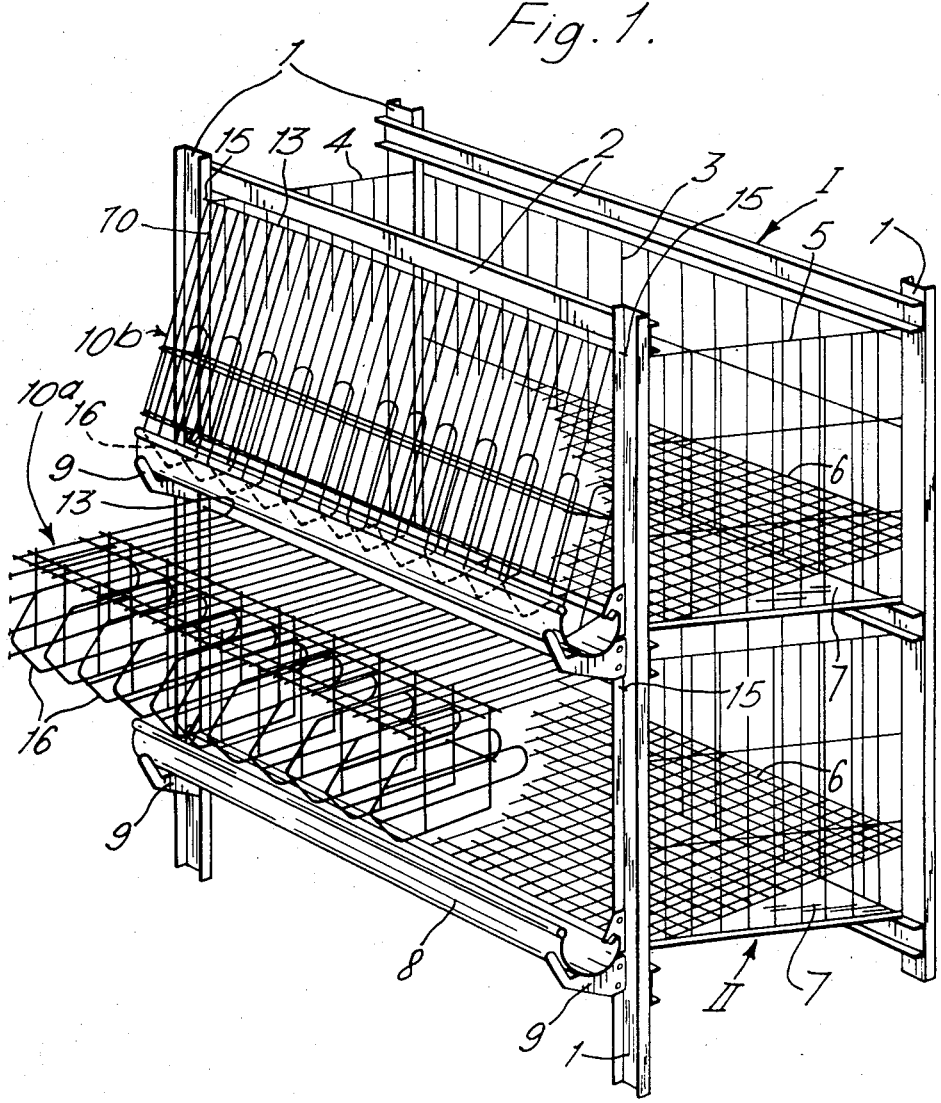

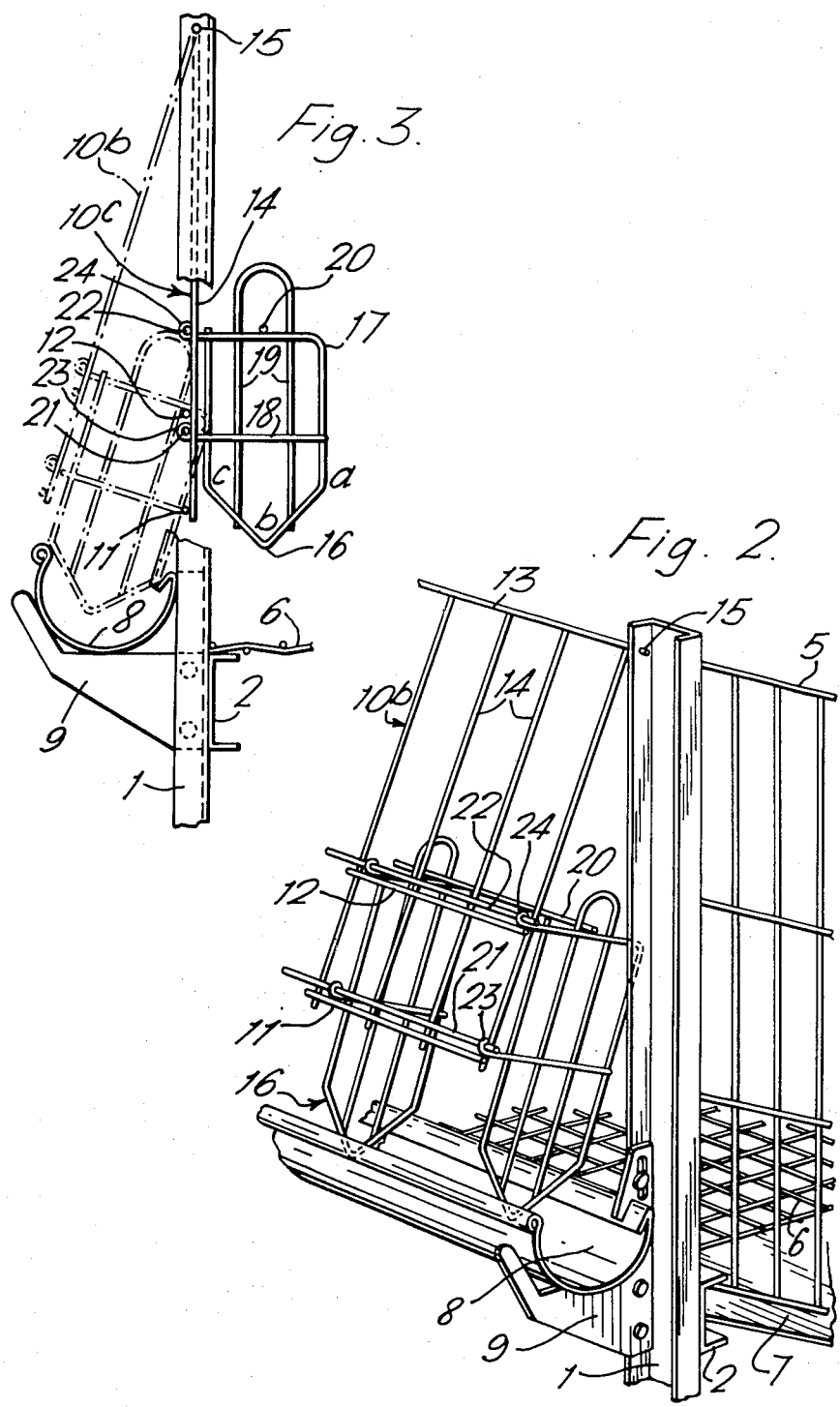

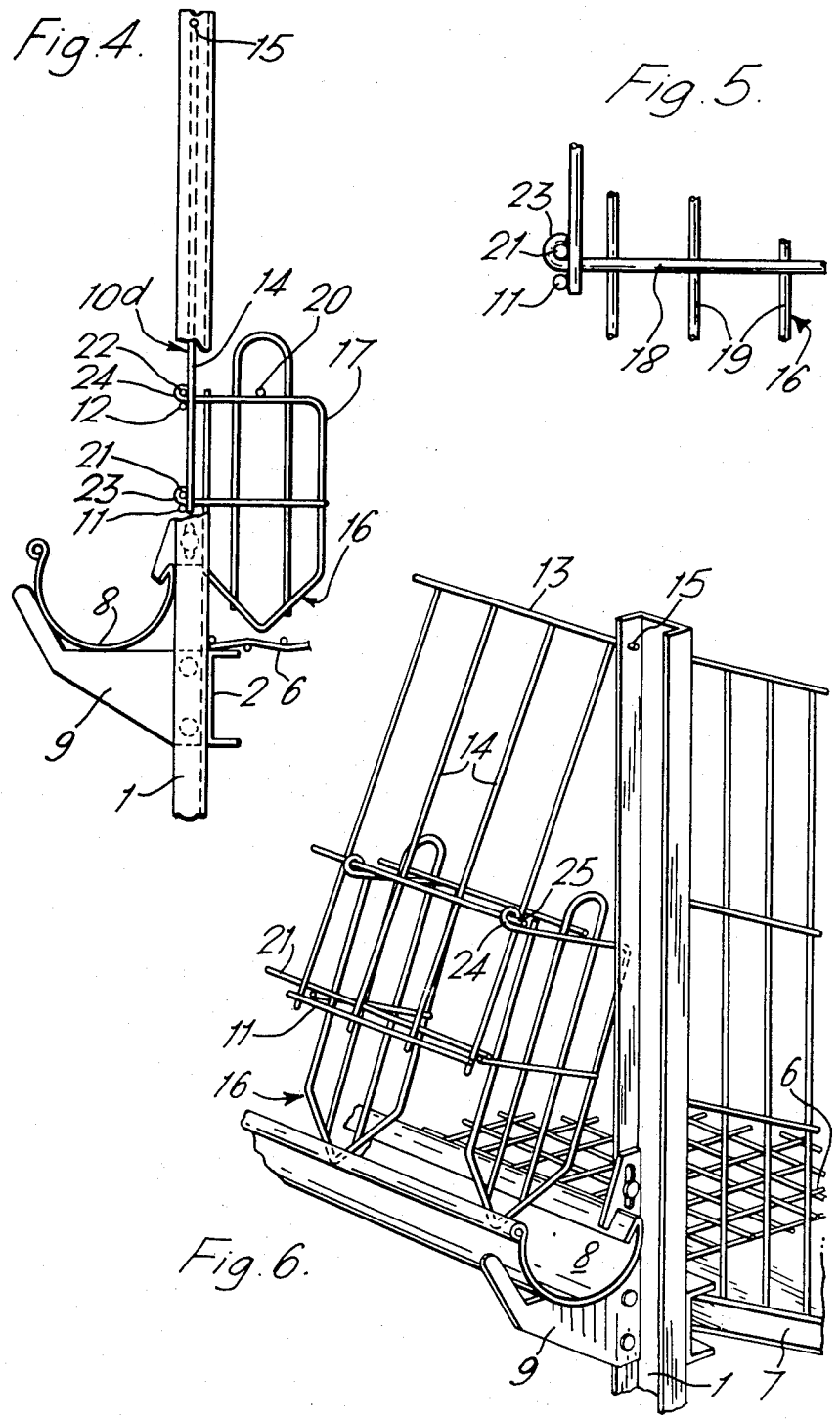

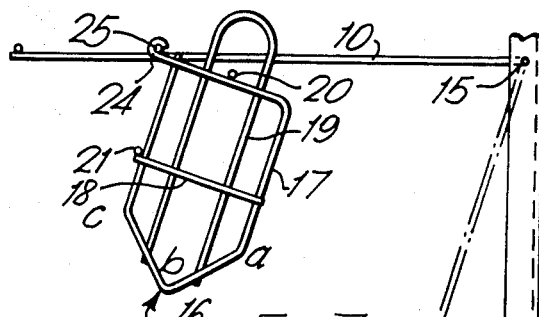
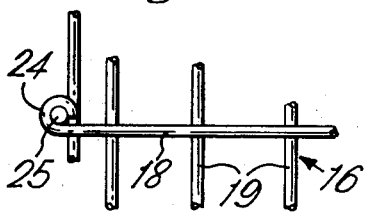
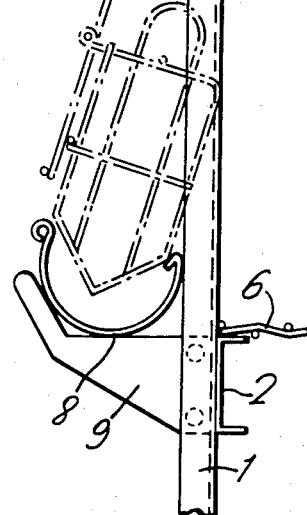
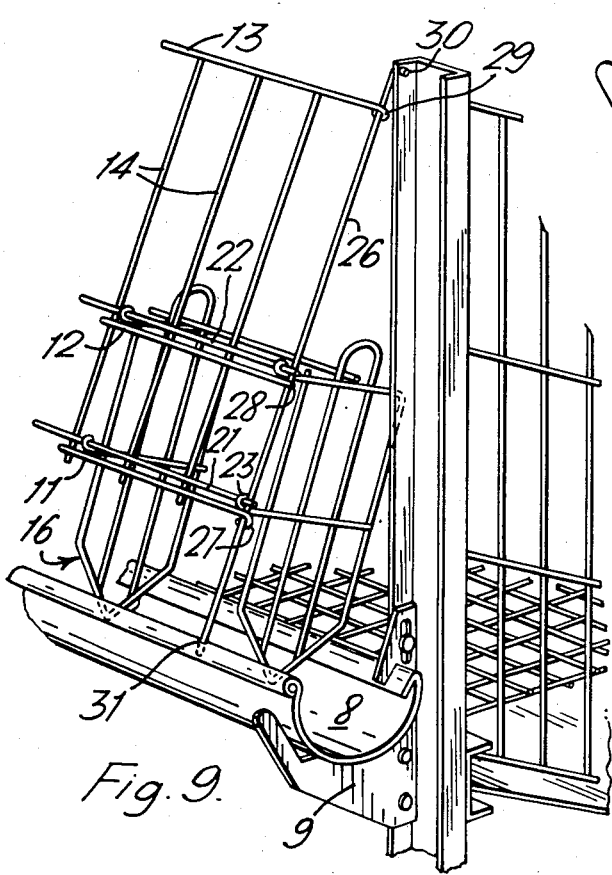

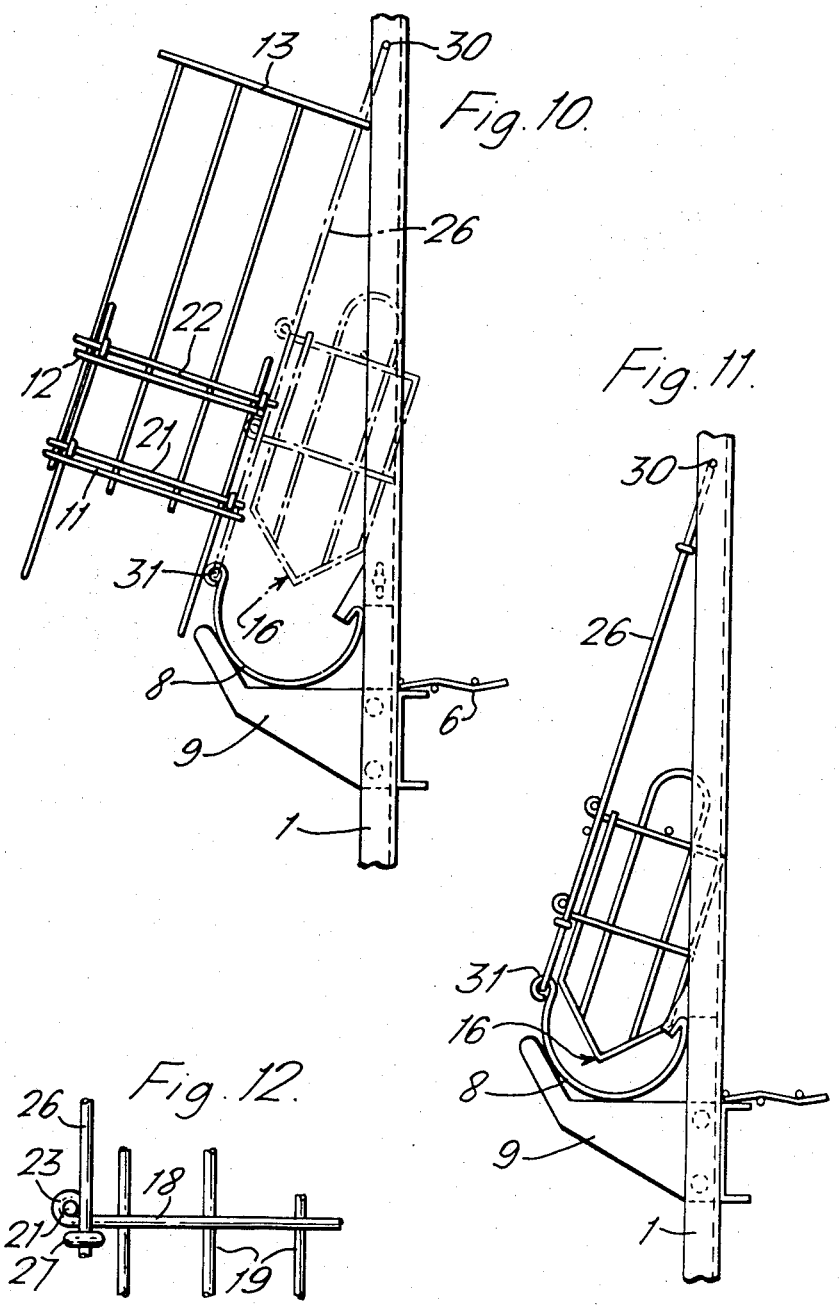

3,690,301

CAGES FOR REARING ANIMALS

BACKGROUND OF THE INVENTION

The present invention relates to cages or batteries for the rearing of a plurality of animals.

The method of rearing animals consisting of placing the animals in closed cages, often covered, where, although the animals are restricted in their movements, they are fed at regular intervals with prepared foodstuffs, is used to an increasing extent.

This method is used in particular for small animals, such as chickens, rabbits, mink and piglets. The cages, which are often grouped into rearing batteries, are usually of a light metal construction, and are often formed from angle irons, metal sections, metal sheets and/or metal latticework.

An important advantage of this method is that it raises the productivity of the staff engaged in looking after the cages or batteries in supplying the animals' feed and removing their droppings and waste. In large installations these operations are generally automated.

However, the living habits, particularly the feeding habits, of some animals renders the sharing of a single cage by a plurality of animals incompatible with rational rearing methods. For this reason it has been hitherto usually necessary to separate the animals, making much more equipment necessary.

Batteries have been proposed which have individual feed troughs for each animal, but this solution is not suitable for the installation of rapid and automatic feeding equipment.

It is a desideratum of the present invention to obviate or at least substantially reduce these difficulties.

SUMMARY OF THE INVENTION

In accordance with the invention, there is provided a cage for the rearing of a plurality of animals including a feed trough extending along one side of the cage, a movable panel disposed in said one side of the cage constituting an access door to the cage, separating members carried by the movable panel and being removably engageable with the feed trough, the arrangement being such that with the separating members engaged with the feed trough, animals within the cage are enabled to feed from the feed trough with said separating members separating at least the heads of adjacent animals.

In one embodiment of the invention, the movable panel may be capable of movement to a position inwards of the cage relative to the feed trough such as to prevent access of animals within the cage to the feed trough.

Various purposes, objects, features and advantages will clearly appear from the detailed description given below taken in connection with the accompanying drawings which form part of this specification and illustrate merely by way of examples embodiments of the devices of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings in which:

FIG. 1 is a perspective view of a rearing battery having two superimposed cages according to the invention;

FIG. 2 is a perspective view of part of one of the cages of FIG. 1 and, in particular, of its movable panel and its feed trough;

FIGS. 3 and 4 are side elevations of part of one of the cages of FIG. 1, partly cut away, showing the various positions of the movable panel and the separating members;

FIG. 5 illustrates a detail of the manner of fixing of a separating member to the movable panel of one of the cages of FIG. 1;

FIG. 6 is a perspective view of part of another embodiment of a cage according to the invention, showing in particular its movable panel and its feed trough;

FIG. 7 is a side elevation of part of the cage of FIG. 6;

FIG. 8 illustrates a detail of the manner of fixing of a separating member to the movable panel of the cage of FIG. 6;

FIG. 9 is a perspective view of a further embodiment of a cage according to the invention, showing, in particular, its movable panel and its feed trough;

FIGS. 10 and 11 are side elevations of part of the cage of FIG. 9; and

FIG. 12 illustrates a detail of the manner of fixing of a separating member to the movable panel of the cage of FIG. 9.

DESCRIPTION OF THE PREFERRED EMBODIMENTS

Reference will first be made to FIGS. 1 to 5 which show a rearing battery comprising two superimposed cages according to the invention. These cages are built as a single block by means of metal sections forming the uprights 1 and crossframes 2, and welded metal wire panels forming the rear walls 3, lateral walls 4 and 5 and floor 6 of each cage, said floor being arranged above a rearwardly sloping plate 7 which serves to receive urine and other waste from animals within each cage.

On the front face of each cage and at a level slightly above that of the corresponding floor is arranged a gutter-type of feed trough 8 which is fixed by mountings 9 to the front uprights 1 and extends along substantially the whole length of the cage.

Associated with this feed trough is a movable panel 10 in the form of horizontal bars 11, 12, 13 and perpendicular bars 14 and which can pivot about the axis of its upper bar 13 of which the extended ends are pivotally mounted at 15 in the uprights 1.

The pivotting panel 10 forms the door to each cage and can be fully raised as shown at 10a (FIG. 1) to introduce the animals into the cage.

This panel 10 carries separating members 16. Each of these is constituted by a small metal latticework panel, consisting of a wire 17 forming the frame and braced by a crosspiece 18 and a wire 19 bent in the form of a hairpin. The lower portion of the frame 17 is in the shape of an isosceles triangle abc (FIG. 3), so that with the oscillating panel in the sloping position 10b, it engages in the feed trough 8 in such a way that the members 16 divide the feed trough into compartments, each compartment of the feed trough receiving only the head of a single animal.

However, when the movable panel 10 is in the vertical position 10d (FIG. 4) the feed trough is located outside the cage and the animals therein are separated from the trough by the movable panel 10 and are unable to reach any foodstuff in the trough.

The separating members 16 of one cage are interconnected by means of a bar 20. In addition the separating members are movably connected to the movable panel 10 by means of two bars 21, 22 which pass through eyelets 23, 24 provided on each of the separating members and bear against the vertical bars 14 of the movable panel 10 in such a way as to hold the separating members 16 against the movable panel 10 and perpendicular thereto.

The bars 21, 22 can slide between the two horizontal bars 11 and 12 of the panel 10 and along the vertical bars 14 of this panel 10. This movement allows the separating members 16 to slide along said movable panel 10. This sliding movement is necessary for passing from the position (10b) shown in solid lines in FIG. 2 and shown in dotted lines in FIG. 3 where the separating members 16 are engaged in the feed trough 8 in the normal position, to the position (10d) shown in FIG. 4 where the movable panel is vertical, the separating members 16 being inside the cage and separated from the feed trough by the movable panel. FIG. 3 shows in solid lines the intermediate position 10c where the separating members 16 are raised along the movable panel to permit their disengagement from the feed trough, so as to permit the pivoting of the movable panel about its pivot pins 15.

Latching means may be provided for aiding retention of the panel in any one of its possible positions.

The embodiments of FIGS. 6, 7, and 8 and of FIGS. 9, 10, 11, and 12 are basically similar to the embodiment of FIGS. 1 to 5 described hereinabove, and like members are designated with the same reference numerals in all figures.

The embodiment of FIGS. 6 to 8 differs from that of FIGS. 1 to 5, in that the separating members 16 are not slidable on the movable panel 10, but are pivotally connected to horizontal bar 25 of the panel 10 by means of eyelets 24.

FIG. 7 illustrates (in solid lines) the disposition of the separating members 16 with the panel 10 in the fully open position. As can be seen in dotted lines, when the separating members engage in the trough 8, the separating members have turned about the bar 25 so as to bear against the panel 10.

In the embodiment of FIGS. 9 to 12, the panel 10, instead of pivotting about the axis of the bar 13 as in the other embodiments hereinbefore described, pivots about a bar 26 at the side of the panel extending between the section 1 as shown at 30 and the outer edge of the feed trough 8, as shown at 31. The pivotal connection of the panel 10 to the bar 26 is by means of eyelets 27, 28, and 29 disposed at the ends of horizontal bars 11, 12, and 13.

The separating members 16 are slidable along the panel 10 in the same way as in the embodiment of FIGS. 1 to 6, and the panel 10 is opened for access to the cage from the position shown in FIGS. 9 and 11 by sliding the separating members 16 upwardly along the panel 10 to the position shown in dotted lines in FIG. 10 whereupon the panel can be swung outwardly, pivotting about bar 26.

Rearing cages according to the invention are particularly suited to the rearing of piglets prematurely removed from their sow. By means of the invention several piglets can share the same cage, whilst being prevented, or at least hindered, from trampling on their feed. Regularly distributed feeding can be provided both in time and between animals, each only being able to reach its own individual ration. The feed trough can be more easily kept clean thereby reducing the risk of disease. In addition, easy access to the cage is possible.

Naturally, the separating members 16 can have a shape different from that shown. They can, for example, be oval, circular or some other shape conforming to that of the cross-section of the feed trough. Similarly they can be of sheet metal or any other material.

While the invention has been described and illustrated with respect to certain preferred examples which give satisfactory results, it will be understood by those skilled in the art after understanding the principle of the invention, that various changes and modifications may be made without departing from the spirit of the invention.

What is claimed is:

1. A cage for rearing a plurality of animals comprising, a feed trough extending along one side of the cage and on the outside thereof, a movable closure panel disposed in said one side of the cage and constituting an access door to the cage, said panel being pivotally mounted adjacent its upper end to the cage for pivotal movement about a horizontal axis, a plurality of separating means at substantially right angles to said panel, means mounting said separating means on said panel for vertical movement between a lower and an upper position, said panel having a first locked position wherein said separating means are in their lower position and engageable within said feed trough to enable animals within the cage to feed from the trough with said separating means separating at least the heads of adjacent animals, movement of said separating means to its upper position serving to disengage the same from said trough to enable the panel to be moved to a second position outwardly of said trough to permit transfer of animals to and from the cage, and said panel having a third position wherein said separating means when in their lower position rest inside said cage and against the inner wall of said trough preventing opening of said panel and prohibiting access of said trough to said animals.

2. A cage according to claim 1 wherein said separating means are generally planar members.

3. A cage according to claim 2, wherein said separating means are interconnected so as to be movable as a single unit.

4. A cage according to claim 1, wherein said movable panel and said separating means are formed of metal lattice-work.

5. A cage according to claim 1, wherein said separating means are interconnected so as to be movable as a single unit.

* * * * *